(12) United States Patent
Davis

(10) Patent No.: US 10,013,448 B2
(45) Date of Patent: Jul. 3, 2018

(54) MOBILE DEVICE AGENT FOR PERSONAL DEDUPLICATION

(71) Applicant: Quantum Corporation, San Jose, CA (US)

(72) Inventor: Camden Davis, San Jose, CA (US)

(73) Assignee: Quantum Corporation, San Jose, CA (US)

( * ) Notice: Subject to any disclaimer, the term of this patent is extended or adjusted under 35 U.S.C. 154(b) by 340 days.

(21) Appl. No.: 14/825,470

(22) Filed: Aug. 13, 2015

(65) Prior Publication Data

US 2016/0232195 A1    Aug. 11, 2016

Related U.S. Application Data

(60) Provisional application No. 62/112,232, filed on Feb. 5, 2015.

(51) Int. Cl.
*G06F 17/30* (2006.01)

(52) U.S. Cl.
CPC .............................. *G06F 17/30371* (2013.01)

(58) Field of Classification Search
CPC ................................................ G06F 17/30371
USPC ....................................................... 707/692
See application file for complete search history.

(56) References Cited

U.S. PATENT DOCUMENTS

| | | |
|---|---|---|
| 7,161,506 B2 | 1/2007 | Fallon |
| 7,378,992 B2 | 5/2008 | Fallon |
| 7,415,530 B2 | 8/2008 | Fallon |
| 8,643,513 B2 | 2/2014 | Fallon |
| 9,054,728 B2 | 6/2015 | Fallon |
| 9,116,908 B2 | 8/2015 | Fallon |
| 2016/0154839 A1* | 6/2016 | Bezawada ......... G06F 17/30371 707/692 |
| 2016/0224589 A1* | 8/2016 | Chai ................. G06F 17/30156 707/692 |

* cited by examiner

*Primary Examiner* — Chelcie Daye
(74) *Attorney, Agent, or Firm* — Eschweiler & Potashnik, LLC

(57) ABSTRACT

Methods, apparatus, and other embodiments associated with performing personal deduplication on a mobile device are described. One example method includes accessing a personal or context sensitive deduplication repository, where the context is based on a time of use of the mobile device, a purpose of use of the mobile device, a location of the mobile device, or an application in use by the mobile device, selectively de-duplicating data arriving at the mobile device, and selectively de-duplicating data to be transmitted by the mobile device, where the deduplication is performed using the personal or context sensitive deduplication repository. Example methods and apparatus may employ a chunking and hashing deduplication approach, a vector deduplication approach, or a delta deduplication approach.

24 Claims, 10 Drawing Sheets

US 10,013,448 B2

MOBILE DEVICE AGENT FOR PERSONAL DEDUPLICATION

CROSS REFERENCE TO RELATED APPLICATIONS

This application claims the benefit of U.S. Provisional Application 62/112,232, filed Feb. 5, 2015.

BACKGROUND

Mobile devices are ubiquitous. The amount of data communicated to and from mobile devices continues to grow. The number and type of applications for which mobile devices are used also continues to expand. Even as miniaturization and advancing technology increases the sophistication, power, and capacity of mobile devices including smartphones, improved efficiencies are constantly sought for these devices. Improved efficiencies are needed because smartphones have finite resources. Finite resources may include battery life, memory, or bandwidth. Bandwidth is limited and may be costly since a data plan may charge by the amount of data transmitted or received by the device. Additionally, as more and more mobile devices transmit and receive more and more data to and from more and more applications, access to bandwidth may become more difficult and contention and collisions may become more frequent.

Online streaming video applications consume a significant portion of all bandwidth consumed by computing devices. Users are now accustomed to seeing what they want when they want. Users may no longer be willing to accept watching a television show at the time prescribed by a network. Other than a live event, such as the Super Bowl, time constraints are quickly disappearing. Currently, each person that views streamed content, including television shows, receives a stream of packets that include a portion of the television show. The packets are assembled in the viewing device and displayed in order. If there are three people in a room all watching the same streamed content on separate smartphones then each person is likely receiving all the streamed packets. While conventional broadcasts send video as streams of complete scenes, some types of broadcasts may not send video as streams of complete scenes. For example, in cartoons or video games, the background may be made from a set of fixed images and the foreground or action may be overlaid on the images.

A smartphone may be used to take photographs. While many photographs are completely unique, other photographs are very similar. For example, twenty pictures of a blimp flying over a cityscape may have the identical buildings in the identical locations while the blimp flies by. Conventionally, a smartphone that was going to upload the pictures to a picture repository or that was going to email or text the photos to a recipient would send the entire photograph.

Mobile devices may be used for intelligence gathering by crowd sourced applications. For example, a traffic application may acquire telemetry data from smartphones. The traffic application may then be able to tell where traffic is moving, how quickly traffic is moving, where a backup is growing, how quickly the backup is growing, and where traffic is stopped. The traffic application may receive substantially identical telemetry data from many smartphones. A traffic application may control the number of devices from which telemetry is received by selectively broadcasting a message to a smartphone like "don't send me any more data because you are sending me the same data as the car right beside you". While this may reduce the volume of traffic data received, a smartphone that is still transmitting might still be sending substantially the same information over and over, particularly if the user is stuck in a traffic jam.

BRIEF DESCRIPTION OF THE DRAWINGS

The accompanying drawings, which are incorporated in and constitute a part of the specification, illustrate various example apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. in some examples, an element shown as an internal component of another element may be implemented as an external component and vice versa. Furthermore, elements may not be drawn to scale.

DETAILED DESCRIPTION

Figure 1:
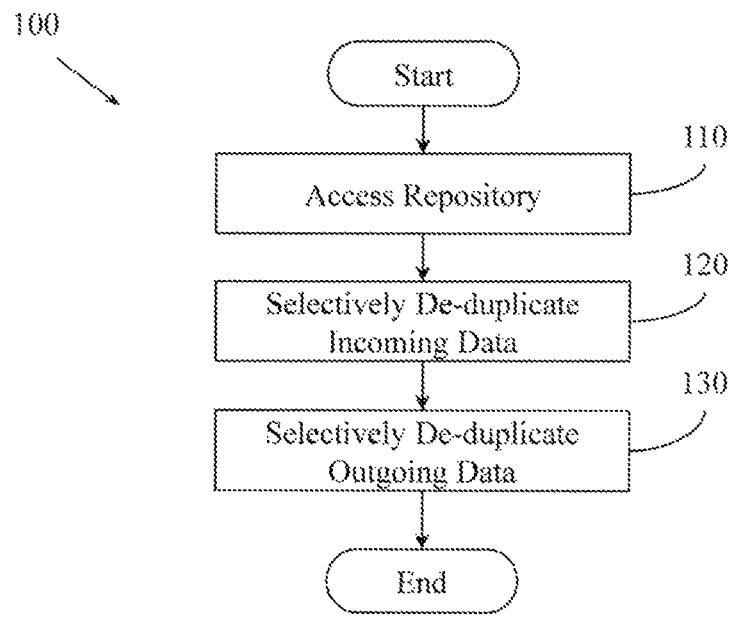
FIG. 1 illustrates an example method for performing deduplication on a mobile device.

Example apparatus and methods provide a solution to the computer specific problems of limited bandwidth, limited battery life, and limited storage on a mobile device that is wirelessly communicating data. This problem did not exist before the advent of wireless data communications to mobile devices like smartphones, tablet computers, and laptop computers. Reducing the amount of data transmitted or received by a mobile device cannot be performed in the human mind because the human mind cannot control the transmission or receipt of electronic data in an electronic device. Similarly, reducing the amount of data transmitted or received by a mobile device cannot be performed using paper and pencil because neither paper nor pencil can control the transmission or receipt of electronic data in an electronic device.

Example apparatus and methods perform deduplication to identify duplicative information that a user may consider redundant. Deduplication reduces redundant data by storing fewer copies of data. Deduplication may involve dividing a larger piece of data into smaller pieces of data. Larger pieces of data may be referred to as "blocks" while the smaller pieces of data may be referred to as "subblocks" or "chunks". Dividing blocks into subblocks may be referred to as "chunking". For example, a message may be a block. The message may be chunked into subblocks consisting of groups of data (e.g., characters, words, phrases, sentences, paragraphs, code). Chunking may employ fixed size subblocks or variable size subblocks.

As unique subblocks are identified they are stored. As new subblocks are chunked, the new subblocks are compared to the unique subblocks in storage. New subblocks that are unique are stored as unique subblocks. New subblocks that are identified as having been previously stored are identified as containing duplicative information. New subblocks that have been previously stored may be identified using hash codes, fingerprints, or block identifiers. There are many ways that a new subblock may be compared to previously stored subblocks. For example, a rolling hash that identifies subblock boundaries in variable length chunking may be used. While chunking and hashing are described, one of ordinary skill in the art will appreciate that other data deduplication approaches may be employed. For example, vectored deduplication or delta deduplication may be employed.

Example apparatus and methods may access or acquire a personal level object store or deduplication repository. In one embodiment, information about the personal level repository may be downloaded to the mobile device. In one embodiment, a portion of the personal level repository may be acquired by the mobile device. The personal level repository may be a portion of a larger repository. For example, an organization (e.g., company, university) may have an organization specific deduplication repository. A user that is a member of that organization may have access to the organization specific repository. However, the user may only process certain types of data on certain topics and thus accessing the entire repository may be inappropriate for mobile computing tasks. In another example, a type of application (e.g., streaming video, video game) may have an application specific deduplication repository. When the user is interacting with an application that has an application specific deduplication repository then the user may be processing certain specific types of data and accessing the entire repository may be inappropriate. In another example, a certain region (e.g., commuter train, university campus, stadium, highway) may have a location specific deduplication repository. More generally, a context sensitive deduplication repository may be available for deduplication for specific times, purposes, locations, or applications.

Therefore, example apparatus and methods may identify a portion of a larger repository that is most likely to be used by a certain user of a mobile device and selectively cause that portion to be made available to the user of the mobile device. Example apparatus and methods may also identify a context specific repository to be used for deduplication associated with the mobile device. In one embodiment, the portion of the larger repository or context specific repository may be downloaded to the mobile device. In another embodiment, information about the portion may be downloaded to the mobile device, or just a certain type of data may be downloaded to the mobile device. For example, hash codes, fingerprints, or block identifiers may be downloaded to the mobile device. In another embodiment, the portion of the larger repository or context specific repository may be made available at a location close to the mobile device, information about the portion may be positioned close to the mobile device, or just a certain type of data, including hash codes, fingerprints, or block identifiers, may be positioned close to the mobile device. For example, when a mobile device is in range of a WiFi station, then the portion, information about the portion, or other data may be provided to the WiFi station for easier, faster, cheaper, more efficient access by the mobile device.

Example apparatus and methods facilitate reducing bandwidth consumption compared to conventional approaches by only providing to the mobile device unique data that is not already available to the mobile device. Example apparatus and methods also facilitate reducing bandwidth consumption compared to conventional approaches by controlling the mobile device to only transmit unique data that is not already available outside the mobile device. Exercising this type of control may include identifying where the mobile device is located and what the mobile device is doing. Once the location and usage of the device is established, then a context-sensitive deduplication repository may be made available for de-duplicating data for the mobile device. Example methods and apparatus thus provide the measurable, real-world result of reducing bandwidth consumption compared to conventional approaches.

Example apparatus and methods may perform deduplication on a mobile device, including a smartphone. Example apparatus and methods may perform deduplication "near" a mobile device at, for example, a modem, a router, a WiFi station, or at another communication node. For example, a communication node that is within a threshold physical distance, or a threshold logical distance, may be considered "near enough" to perform deduplication for the mobile device. Whether deduplication is performed, the type of deduplication performed, the level of deduplication, or parameters for the deduplication may depend, at least in part, on the fact that the data is being transmitted to or received from a mobile device. In one embodiment, whether deduplication is performed, the type of deduplication performed, the level of deduplication, or parameters for the deduplication may depend on information about the mobile device. The information may be about the processor, memory, data plan, or other property of the mobile device. The information may be about a property of a modem, a router, a WiFi station, or another communication node that is in communication with, or being considered to perform deduplication for, the mobile device.

The processing power available to process data on a mobile device may exceed the bandwidth available for receiving or transmitting the processed data. The amount of energy required to run a processor on a mobile device may be much less than the amount of energy required to make a radio transmission, particularly a cellular radio transmission to a distant tower. Thus, in one embodiment, a mobile device may speculatively deduplicate data that might be transmitted while waiting for a transmission opportunity or while processing power is available. Example methods and apparatus therefore offer the measurable, real-world result of improved power usage compared to conventional approaches.

A mobile device may constantly be receiving information about which a user may not even be aware. If the user is sitting still, there may be significant duplication in the data received. For example, incoming telemetry data may be substantially unchanged for a significant period of time while a user sits at home or in a coffee shop or even stuck in traffic. Thus, in one embodiment, small scale deduplication of inbound telemetry data may be performed.

While conventional broadcasts send video as streams of complete scenes, some types of broadcasts may not send video as streams of complete scenes. For example, in cartoons or video games, the background may be made from a set of fixed images and the foreground or action may be overlaid on the images. In an example where fixed backgrounds exist, example apparatus and methods may deduplicate the data received or transmitted with respect to the background. For example, once a background scene has been received then receipt of a fingerprint of the background scene may suffice for continued processing.

Example methods and apparatus may also selectively deduplicate image background data of photographs sent or received by the mobile device. While many photographs are completely unique, other photographs are very similar. For example. twenty pictures of hikers in the Grand Canyon may have identical backgrounds as the hikers walk by. Conventionally, a smartphone that was going to upload the pictures to a picture repository or that was going to email or text the photos to a recipient would send the entire photograph, even though most of the data in the photos was identical. Example methods and apparatus improve on conventional approaches by reducing the amount of data needed to be transmitted when sending a set of photographs where a member of the set is within a threshold similarity of another member of the set.

Smartphones, GPS devices, and other mobile devices may be used for intelligence gathering by crowd-sourced applications. For example, a traffic application may acquire telemetry data from smartphones. The traffic application may then be able to tell how dense traffic is, where traffic is moving, how quickly traffic is moving, where a backup is growing, how quickly the backup is growing, and where traffic is stopped. The traffic application may receive substantially identical telemetry data from many smartphones, or may receive substantially the same telemetry data from a single smartphone repeatedly over a time period. A traffic application may control the number of devices from which telemetry is received by selectively broadcasting a message to a smartphone like "don't send me any more data because you are sending me the same data as the car right beside you". When on-device deduplication is available, conventional approaches to reducing bandwidth include controlling devices to send short messages. Example methods and apparatus improve on such conventional approaches by employing vectored deduplication or delta deduplication. Rather than constraining devices to send short messages, example apparatus and methods may facilitate devices sending longer messages because subsequent longer messages that duplicate or that are similar to previous messages may be deduplicated and just a fingerprint, hash code, identifier, delta code, or vector code may be provided. Thus, rich messages may be sent when appropriate but very small hash codes or identifiers may be sent at other times.

While examples have been described with respect to a smartphone or other mobile device, the example apparatus and methods are not so limited. Example methods and apparatus may be implemented in the "internet of things". As more and more devices are manufactured with data reporting or data receiving capabilities, having the ability to do personal level deduplication on a device or to have a context sensitive deduplication repository may increase. Being able to perform deduplication on or for a mobile device may facilitate changing the paradigm that messages need to be short and infrequent to limit bandwidth usage. Instead of being short and infrequent, the bandwidth consumed may be reduced by de-duplicating messages to allow sending or receiving much more efficient message identifiers. These more efficient message identifiers may include deduplication hash codes, blocklet identifiers, or other identifiers.

The detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities, Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates an example method 100 for performing personal deduplication on a mobile device. The mobile device may be a smartphone, a tablet computer, a laptop computer, a satellite phone, a game console, a streaming video device, a smart watch, smart glasses, a car entertainment system, or other mobile device. Method 100 includes, at 110, accessing a personal or context sensitive deduplication repository. Method 100 also includes, at 120, selectively de-duplicating data arriving at the mobile device, where the de-duplicating is performed using the personal or context sensitive deduplication repository. Method 100 further includes, at 130, selectively de-duplicating data to be transmitted by the mobile device. The de-duplicating of data to be transmitted is performed using the personal or context sensitive deduplication repository. In one embodiment, the context is based on a time of use of the mobile device, a purpose of use of the mobile device, a location of the mobile device, or an application in use by the mobile device. In another embodiment, the context may be defined using other parameters. In one embodiment of method 100, de-duplicating the data is performed using a chunking and hashing approach. In another embodiment, de-duplicating the data is performed using a vectored deduplication approach, or a delta deduplication approach. In another embodiment, other deduplication techniques may be used.

While FIG. 1 illustrates various actions occurring in serial, it is to be appreciated that various actions illustrated in FIG. 1 could occur substantially in parallel. By way of illustration, a first process could access a personal or context sensitive deduplication repository, a second process could selectively deduplicate incoming data, and a third process could selectively deduplicate outgoing data. While three processes are described, it is to be appreciated that a greater or lesser number of processes could be employed and that lightweight processes, regular processes, threads, and other approaches could be employed.

Figure 2:
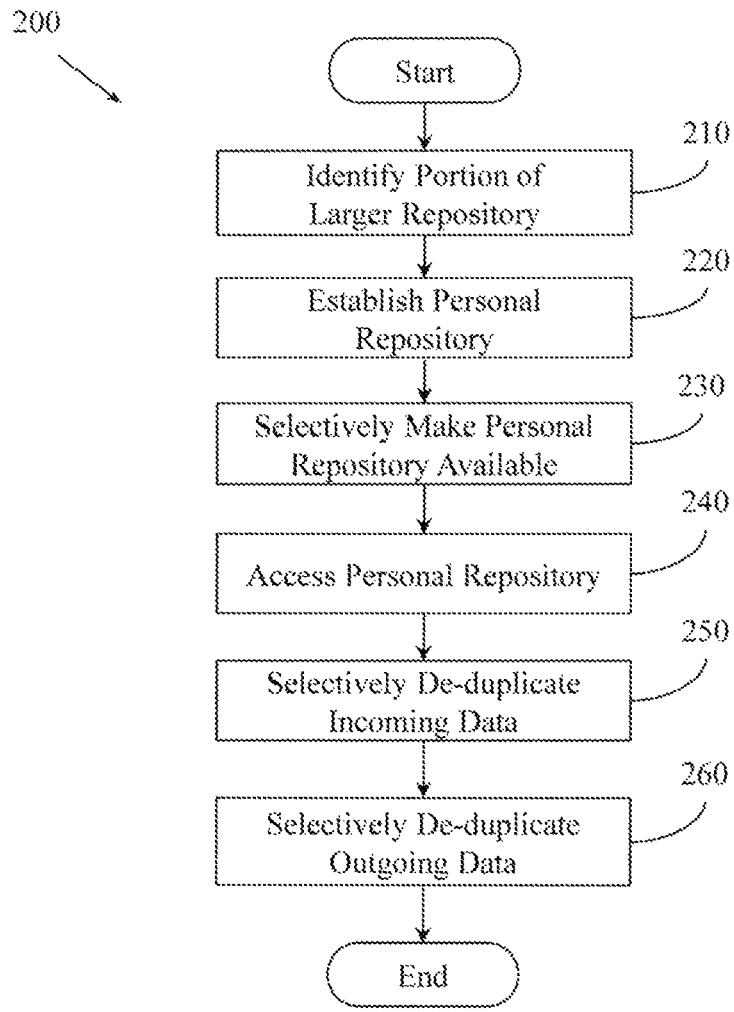
FIG. 2 illustrates an example method for performing deduplication on a mobile device.

FIG. 2 illustrates an example method 200 for performing personal deduplication on a mobile device. Method 200 is similar to method 100 but includes additional actions. Method 200 includes, at 210, identifying a portion of a larger deduplication repository. Method 200 identifies the portion of the larger deduplication repository by determining if the larger deduplication repository has at least a threshold probability of being used by a user. The threshold possibility may require that the larger deduplication repository have at least a 50% chance of being used by a user. In other embodiments, other thresholds may be employed. If the larger deduplication repository has at least the threshold probability of being used by the user, method 200, at 220, establishes the personal or context sensitive deduplication repository as the portion of the larger deduplication repository. Method 200 also includes, at 230, selectively causing the portion of the larger deduplication repository to be made available to the user of the mobile device. Method 200 further includes, at 240, accessing the personal or context sensitive deduplication repository. Method 200 also includes, at 250, selectively de-duplicating incoming data. Method 200 also includes, at 260, selectively de-duplicating outgoing data.

Figure 3:
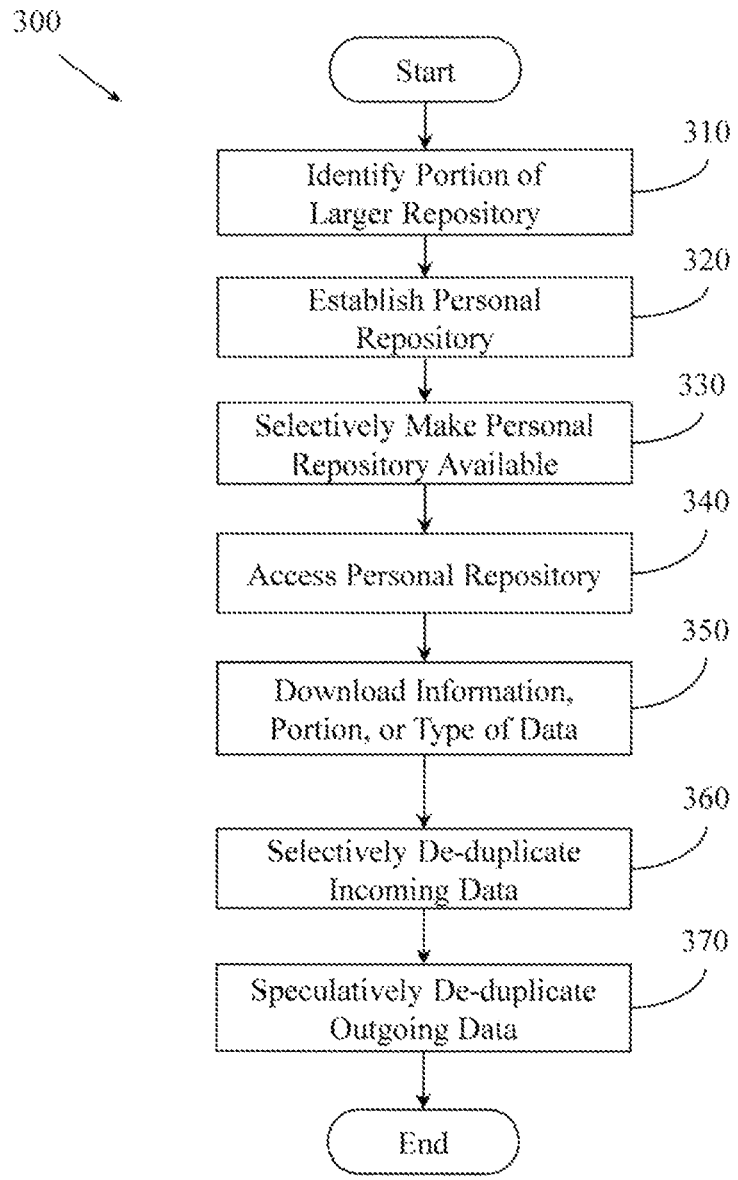
FIG. 3 illustrates an example method for performing deduplication on a mobile device.

FIG. 3 illustrates an example method 300 for performing personal deduplication on a mobile device. Method 300 is similar to methods 100 and 200 but includes further additional actions. Method 300 includes, at 310, identifying a portion of a larger deduplication repository. Method 300, at 320, establishes the personal or context sensitive deduplication repository as the portion of the larger deduplication repository. Method 300 also includes, at 330, selectively causing the portion of the larger deduplication repository to be made available to the user of the mobile device. Method 300 further includes, at 340, accessing the personal or context sensitive deduplication repository.

Method 300 also includes, at 350, controlling the mobile device to download information about the personal or context sensitive deduplication repository. Method 300 may also, at 350, control the mobile device to download the portion of the personal or context sensitive deduplication repository. Method 300 may further, at 350, control the mobile device to download a type of data from the personal or context sensitive deduplication repository. In one embodiment, the type of data is a hash code, a fingerprint, or a block identifier. In another embodiment, the type of data may be another data type. Downloading a particular type of data, rather than all the data from the portion of the personal or context sensitive deduplication repository may reduce the bandwidth used by example methods and apparatus. Downloading the particular type of data may also reduce the number of and computational complexity of operations performed by example methods and apparatus, which may decrease the power required by example methods and apparatus compared to conventional approaches, and may also increase the speed of example methods and apparatus compared to conventional approaches.

In one embodiment, method 300, at 350, downloads the portion, the information, or the type of data to the mobile device. In another embodiment, however, method 300, at 350, controls the mobile device to cause the portion of the personal or context sensitive deduplication repository, the information about the personal or context sensitive deduplication repository, or the type of data from the personal or context sensitive deduplication repository, to be downloaded to a location within a threshold distance of the mobile device. The threshold distance may be a physical distance, or the threshold distance may be a logical distance. For example, method 300 may decide to download or synchronize a portion of the repository to storage accessible via an external device such as a router or a car entertainment system if method 300 detects the external device is within a threshold physical distance of the mobile device. In one embodiment, the threshold physical distance is ten meters. In other embodiments, other threshold distances may be employed. In another example, method 300 may decide to download the information about the repository to a server that is four or fewer logical steps away from the mobile device. For example, a user may be using a laptop computer that is networked to a smartphone being employed as a WiFi hot spot. The smartphone may be connecting to a wireless router that is twenty meters away. The router may be connected to a server. In this example, method 300 decides to download the information to the server because the server is within the threshold number of logical steps from the mobile device. In another embodiment, different distances, different numbers of logical steps, or different combinations of different distances and logical steps may be employed.

In one embodiment, example methods and apparatus may detect a new external device. For example, a user may move from a coffee shop to a library, and the user's smartphone may detect different new external devices that support deduplication. When a new external device is identified, an existing repository may or may not exist on the new external device. If a repository does exist on the new external device it may not be synchronized with the existing repository, but the new external device may be higher in the threshold map. For example, the new external device may be only two instead of three logical steps away from the user's smartphone, or the new external device may be closer to the user than other available external devices. Rather than downloading a new repository to the new external device, example methods and apparatus may, at 330, synchronize the repository from another device in the map or from the smartphone's storage with a repository on the new, external device.

Method 300 also includes, at 360, selectively de-duplicating the incoming data. The probability that method 300, at 360, selectively deduplicates the data arriving at the mobile device is a function of information about the mobile device. The information about the mobile device may include an amount of processor power available to the mobile device, an amount of available energy, an amount of available memory, an application using the data, or a data plan associated with the mobile device. The amount of available energy may include available battery power, or other types of electrical energy. The data arriving at the mobile device may include incoming telemetry data. Method 300 may, at 360, deduplicate the incoming telemetry data. In another embodiment, the information about the mobile device may include other information. The probability that the incoming data is selectively deduplicated may also be controlled by the user.

Method 300 further includes, at 370, speculatively de-duplicating data that is within a threshold probability of being transmitted by the mobile device. The probability that the data to be transmitted by the mobile device will be speculatively deduplicated is a function of at least one variable associated with the mobile device or the environment in which the mobile device is operating. The at least one variable may describe the operating conditions of the mobile device, or the operating conditions of the environment in which the mobile device is operating. For example, the probability may be based on processing power available to the mobile device or to devices within the operating environment. The probability may be based on an amount of available bandwidth, an amount of energy required to process the data, an amount of energy required to transmit the data, or an amount of time since a previous transmission. The probability may also be user controllable. Speculatively de-duplicating the data provides the measurable, real-word result of more efficiently using available mobile device or network resources compared to conventional approaches. Even though extra processing cycles may be used to speculatively deduplicate data that is not transmitted, the savings in bandwidth and power needed to transmit data that is speculatively deduplicated may more than offset the extra processing cycles spent on data that is never transmitted.

In one embodiment, speculatively de-duplicating data also includes selectively de-duplicating data to be transmitted by the mobile device. The probability that method 300 selectively deduplicates the data to be transmitted by the mobile device is a function of the information about the mobile device. The probability that method 300 selectively deduplicates the data to be transmitted by the mobile device may also be user controllable.

Figure 4:
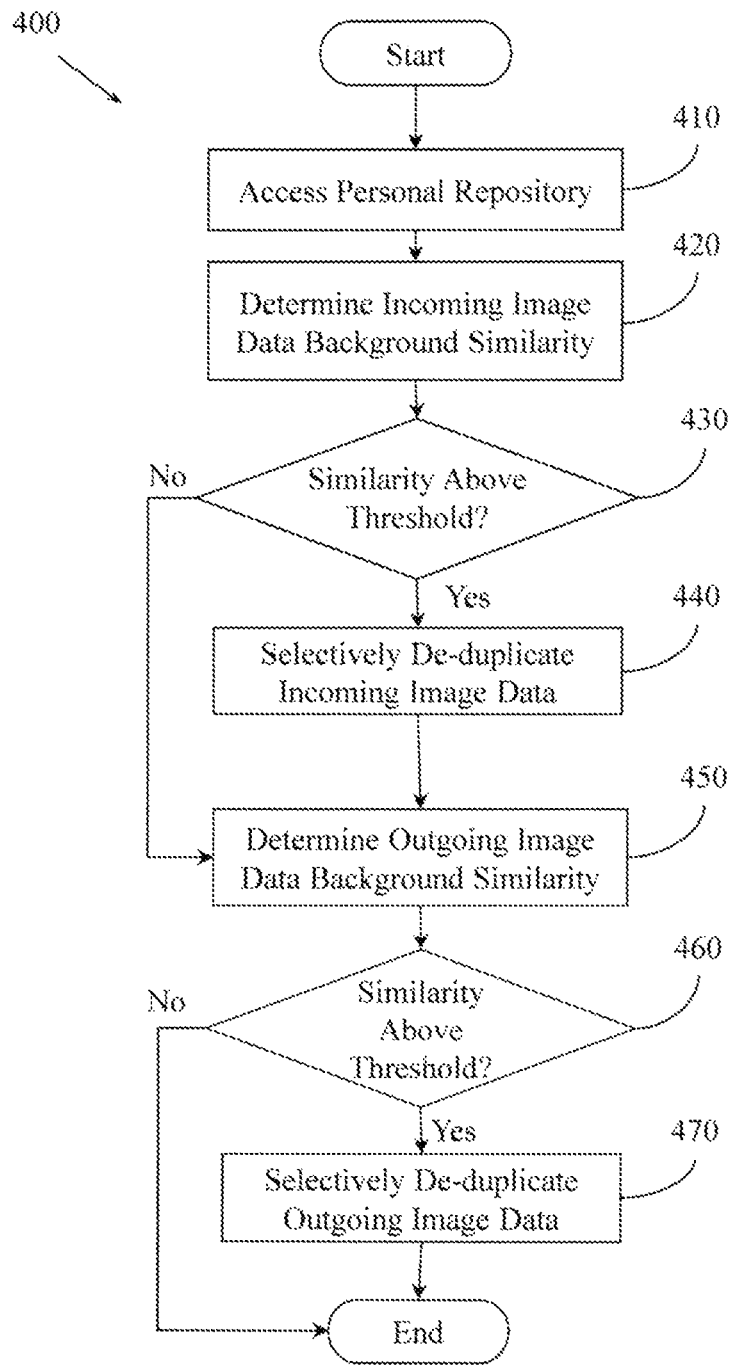
FIG. 4 illustrates an example method for performing deduplication on a mobile device.

FIG. 4 illustrates an example method 400 for performing personal deduplication on a mobile device. The incoming data may be image data or video data. The image data or video data may include background image data and foreground image data. Similarly, the data to be transmitted by the mobile device may be image data or video data, and may include background image data and foreground image data. For example, the incoming data may include video data associated with a soccer video game. Background image data may describe how the soccer field is to be displayed (e.g. green, rectangular, X pixels wide, Y pixels long, static), while foreground image data may describe animated, moving players and the ball. Method 400 includes, at 410, accessing a personal or context sensitive deduplication repository.

Method 400 also includes, at 420, determining the similarity between an incoming background image data at a first instant and an incoming background image data at a second instant. Method 400, at 430, determines if the similarity between the incoming background image data at the first instant and the incoming background image data at the second instant is above a threshold level of similarity. If the similarity is above the threshold level, method 400 continues and, at 440, selectively deduplicates the incoming image data. If the similarity is not above the threshold level, method 400 proceeds to 450. Method 400 includes, at 450, determining the similarity between an outgoing background image data at a first instant and an outgoing background image data at a second instant. Method 400, at 460, determines if the similarity between the outgoing background image data at the first instant and the outgoing background image data at the second instant is above a threshold level of similarity. If the similarity is above the threshold level, method 400 continues and, at 470, selectively deduplicates the outgoing image data.

In one embodiment, the threshold level of similarity may be equal to or greater than 50% level of similarity. For example, if a first 1024 pixel image has 512 pixels that contain identical data to a second 1024 pixel image, the images would be 50% similar, and would qualify for de-deduplication. However, in this example, if only one pixel was the same, the image would not qualify for deduplication. The threshold level of similarity for incoming data may be the same or different as the threshold level of similarity for outgoing data. In other embodiments, other threshold levels of similarity may be used.

Example methods and apparatus may also conceptually de-resolve data to be selectively deduplicated. Example methods and apparatus may allow distinguishing between data transmissions associated with the same data from data transmissions associated with the same story. For example, a data transmission may be a video stream of documentary about birds. The stream may consist of an audio track and a video track consisting of background image data of a maple tree and sky and foreground image data of a blue jay perched in the maple tree. If the blue jay is not moving, and the tree is also not moving, there may be a 100% similarity between a first image at a first instant in the stream and a second image at a second instant in the stream. The audio track may consist of a constantly changing audio recording of a bird song and a narrator reading a script that also does not repeat. Example methods and apparatus may distinguish the video data of the bird and tree (e.g. data transmissions associated with the same data) from the audio track (e.g. data transmissions associated with the same story) and treat the different distinguished transmissions differently with respect to deduplication. For example, one embodiment may decide to deduplicate the video stream, but to leave the audio stream untouched. In one embodiment, the deduplicated message includes a fingerprint, a hash code, an identifier, a delta code, or a vector code. Returning to the soccer video game example, one embodiment may deduplicate the data associated with the depiction of the soccer field, while simultaneously deciding to not deduplicate data associated with the moving players and the ball.

Example methods and apparatus, including methods 100, 200, 300, 400, and 500 may also generate a deduplicated message by de-duplicating a first message about to be transmitted from the mobile device, where the level of deduplication is a function of the similarity between the first message and a second, different message sent at an earlier time from the mobile device. For example, methods and apparatus described herein may be employed for intelligence gathering by crowd-sourced applications, including traffic applications, Conventionally, a traffic application may acquire telemetry data from smartphones. The conventional traffic application may then be able to tell where traffic is moving, how quickly traffic is moving, where a backup is growing, how quickly the backup is growing, and where traffic is stopped. The conventional traffic application may receive substantially identical telemetry data from many smartphones, or may receive repetitive, substantially similar telemetry data or messages from a single smartphone. A conventional traffic application may control the number of devices from which telemetry is received by selectively broadcasting a message to a smartphone like "don't send me any more data because you are sending me the same data as the car right beside you". While this may reduce the volume of traffic data received, a smartphone that is still transmitting could still be sending substantially the same information repeatedly, particularly if the user is stuck in a traffic jam. Example methods and apparatus improve on conventional approaches by using personal, context sensitive deduplication to optimize this type of data reporting. Rather than constraining the mobile device to send short messages, example methods and apparatus facilitate the mobile device to send long messages because subsequent long messages that duplicate or are similar to previous messages may be deduplicated. Reduplicated messages may include just a fingerprint, a hash code, an identifier, a delta code, or a vector code to be transmitted. Example methods and apparatus thus improve on conventional approaches by sending long, rich messages when appropriate, and by sending very small hash codes or identifiers at other times, thereby reducing bandwidth used, and reducing the processing resources required by the traffic application.

Figure 5:
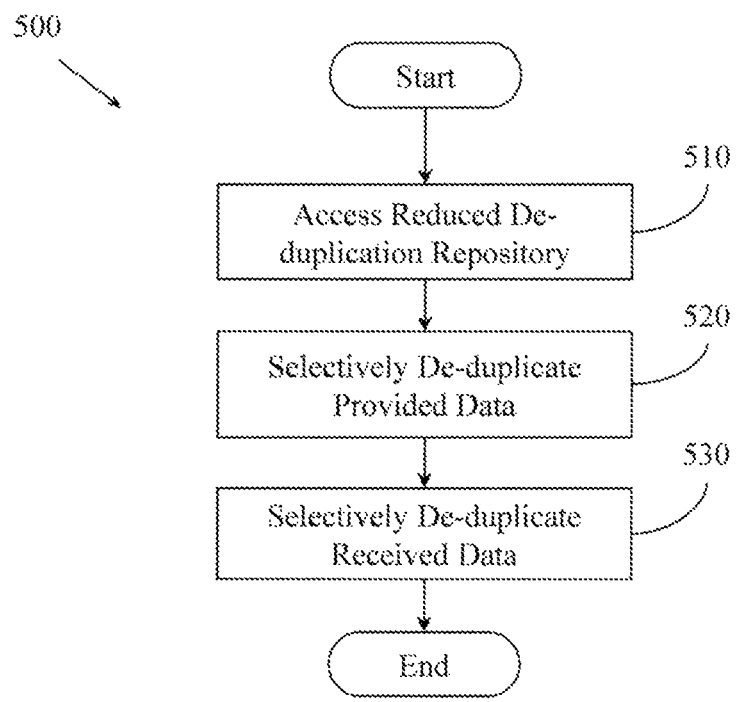
FIG. 5 illustrates an example method for performing deduplication on a mobile device.

FIG. 5 illustrates an example method 500 for supporting personal deduplication on a smartphone. Method 500 includes, at 510, accessing a reduced deduplication repository associated with a user of the smartphone, an application being run by the smartphone, and a geographic location of the smartphone. Method 500 also includes, at 520, selectively de-duplicating data to be provided to the mobile device using the reduced deduplication repository. In one embodiment, method 500 further includes, at 530, selectively de-duplicating data received from the mobile device using the reduced deduplication repository.

Figure 6:
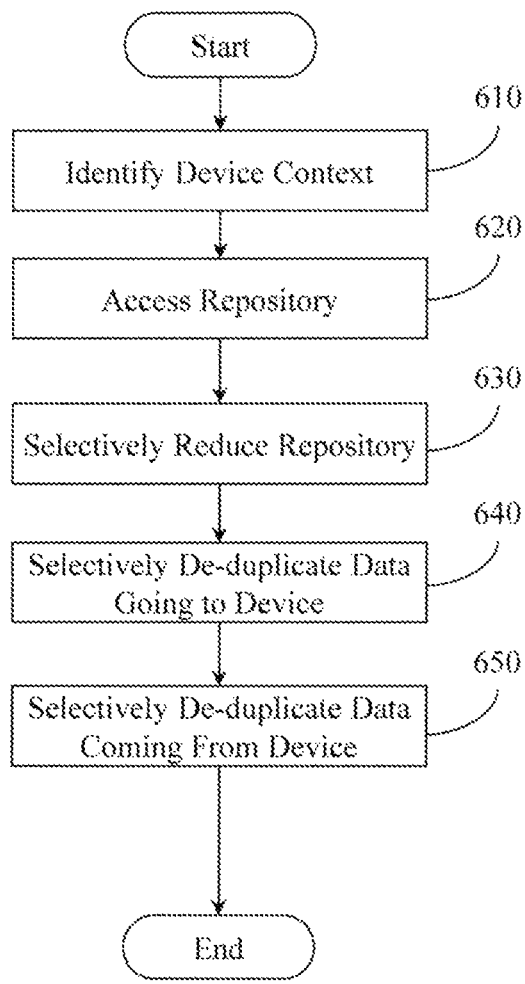
FIG. 6 illustrates an example method for performing deduplication on a mobile device.

FIG. 6 illustrates an example method 600 for performing deduplication on a mobile device. Method 600 includes, at 610, identifying a mobile device context. In one embodiment, the context is based on a time of use of the mobile device, a purpose of use of the mobile device, a location of the mobile device, or an application in use by the mobile device. In another embodiment, the context may be based on other information about the mobile device, or about the user of the mobile device.

Method 600 also includes, at 620, accessing a personal or context sensitive repository. In one embodiment, the repository is a large, general repository. For example, an organization may maintain a large, general repository. An employee of the organization may, after method 600 identifies the context of the mobile device used by the employee, access the large, general repository.

Method 600 also includes, at 630, selectively reducing the repository. Selectively reducing the repository may involve identifying a portion of the larger, general repository that is within a threshold likelihood of being used by the user of a mobile device and selectively causing that portion of the larger general repository to be made available to the user of the mobile device. Selectively reducing the repository may also include identifying a context specific repository to be used for deduplication associated with the mobile device. For example, a first context specific repository for employees of the organization located in Cleveland may be identified, while a second, different context specific repository for employees located in San Jose may also be identified. In one embodiment the identified portion of the larger repository or the context specific repository may be downloaded to the mobile device. Additionally, information about the portion may be downloaded to the mobile device, or just a certain type of data, including hash codes, fingerprints, or block identifiers, may be downloaded to the mobile device.

Method 600 also includes, at 640, selectively de-duplicating data going to the mobile device. Selectively de-duplicating data going to the device may include using a chunking and hashing deduplication approach, a vector deduplication approach, or a delta deduplication approach. In one embodiment, data going in to the device may include telemetry data, image data, video data, or other data. Method 600, at 640, may also selectively control the level of deduplication based, at least in part, on the context, on a user input, on a deduplication policy, or on information about the data going to the device. Selectively de-duplicating data going to the mobile device may occur on the mobile device, may occur on a device located within a threshold physical or logical distance from the device, or may occur on a combination of devices.

Method 600 also includes, at 650, selectively de-duplicating data coming from the device. Selectively de-duplicating data coming from the device may include de-duplicating data coming from the device on the device, or de-duplicating data coming from the device at, for example, a modem, a router, a WiFi station, or at another communication node located within a threshold physical or logical distance from the device. The level of deduplication may be based on a property of the device, a property of the data coming from the device, a deduplication policy, on local network conditions, or on other factors.

Figure 7:
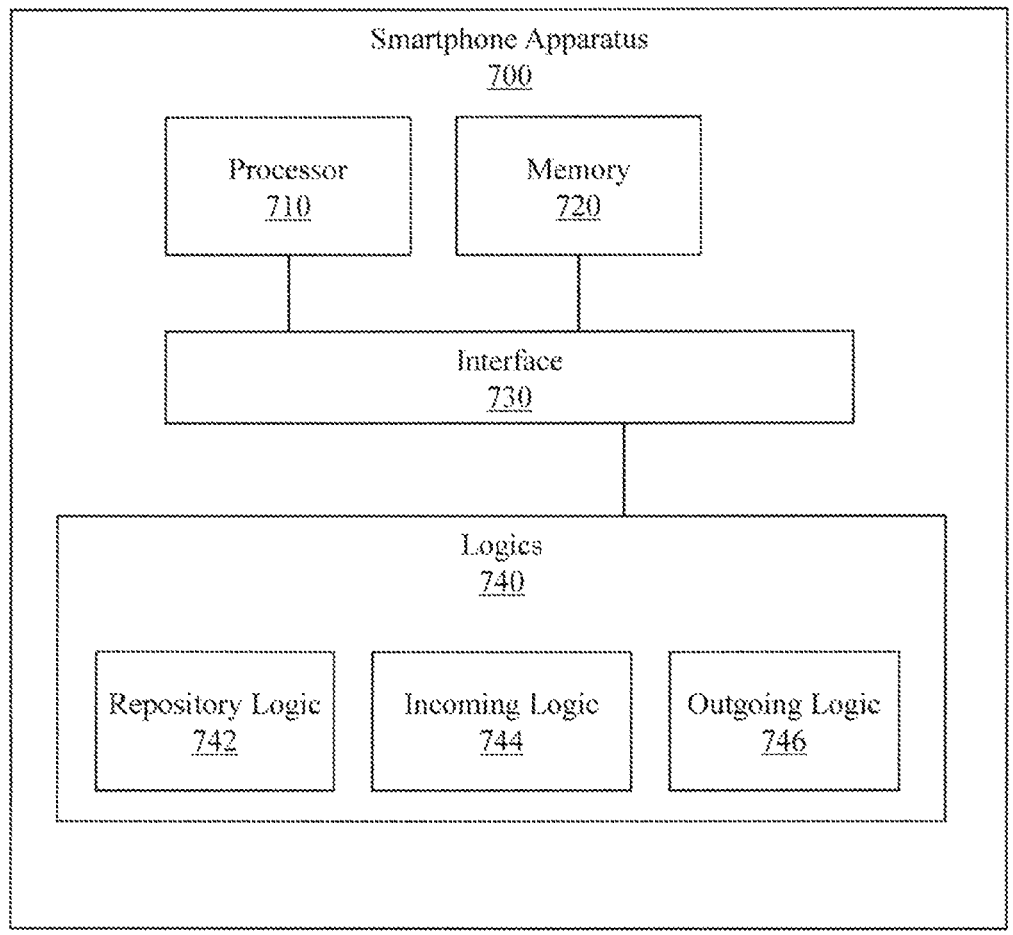
FIG. 7 illustrates an example smartphone apparatus for de-duplicating incoming and outgoing data.

FIG. 7 illustrates an example smartphone apparatus 700 for de-duplicating incoming and outgoing data. Apparatus 700 includes a processor 710, a memory 720, a set of logics 740, and an interface 730 that connects the processor 710, the memory 720, and the set of logics 740. The set of logics 740 includes a repository logic 742, an incoming logic 744, and an outgoing logic 746. In one embodiment, the functionality associated with the set of logics 740 may be performed, at least in part, by hardware logic components. The hardware logic components may include, but are not limited to, field-programmable gate arrays (FPGAs), application specific integrated circuits (ASICs), application specific standard products (ASSPs), system on a chip systems (SOCs), graphic processing units (GPUs), or complex programmable logic devices (CPLDs). In one embodiment, individual members of the set of logics 740 are implemented as ASICs or SOCs. Apparatus 700 may be operably connected to a smartphone, a laptop computer, a tablet computer, a desktop computer, a smart watch, smart glasses, a network communication device, or a set of data storage devices.

In one embodiment of apparatus 700, set of logics 740 are FPGAs, ASICs, ASSPs, SOCs, or CPLDs. In another embodiment, set of logics 740 may be other types of systems or circuits.

The set of logics 740 includes repository logic 742 that accesses a smartphone-centric deduplication repository. Repository logic 742 accesses a portion of a larger deduplication repository that has at least a threshold probability of being used by a user. Repository logic 742 defines the smartphone-centric deduplication repository as the portion of the larger deduplication repository. Repository logic 742 also selectively causes the portion of the larger deduplication repository to be made available to the smartphone apparatus 700. In one embodiment, the context is a function of an identity of a user of the smartphone apparatus 700, a location of the smartphone apparatus 700, and an application in use by the smartphone apparatus 700. In other embodiments, the context may be a function of data incoming to the smartphone apparatus 700, data outgoing form the smartphone apparatus 700, or other variables.

In one embodiment, repository logic 742 downloads the portion of the smartphone-centric deduplication repository, or information about the smartphone-centric deduplication repository, to the smartphone apparatus 700. In another embodiment, repository logic 742 downloads the portion of the smartphone-centric deduplication repository, or information about the smartphone-centric deduplication repository, to another device located within a threshold distance of the smartphone apparatus 700.

Smartphone apparatus 700 also includes incoming logic 744 that selectively deduplicates incoming data using the smartphone-centric deduplication repository. Incoming logic 744 selectively deduplicates incoming data using the smartphone-centric deduplication repository based on a property of the smartphone apparatus 700 or a property of the incoming data. The property of the smartphone apparatus 700 may include an amount of processor power available to the smartphone apparatus 700, an amount of memory available to smartphone apparatus 700, an application using the data, or a data plan associated with the smartphone apparatus 700. In one embodiment, the property of the incoming data includes a data type, a file size, a block size, a packet size, an age of the incoming data or an identification of a sender associated with the incoming data. In one embodiment, incoming logic 744 may selectively deduplicate the incoming data by controlling the level of deduplication. The level of deduplication may be based on the property of the smartphone apparatus 700 or the property of the incoming data. In another embodiment, incoming logic 744 may base the level of deduplication on a deduplication policy, on a user selection, or on network conditions.

Smartphone apparatus 700 also includes outgoing logic 746 that selectively deduplicates outgoing data using the smartphone-centric deduplication repository. Outgoing logic 746 selectively deduplicates outgoing data by speculatively de-duplicating data that is within a threshold probability of being transmitted by the smartphone apparatus. The probability that outgoing logic 746 will speculatively deduplicate the outgoing data is a function of the property of the smartphone apparatus 700 or a property of a target of the outgoing data. In one embodiment, the property of the smartphone apparatus 700 includes an amount of energy required to transmit the data, or a time since a previous transmission. In this embodiment, selectively de-duplicating the outgoing data includes controlling the level of deduplication based on the property of the smartphone apparatus 700 or the property of the target of the outgoing data. In another embodiment, the level of deduplication applied to the outgoing data by outgoing logic 746 may be a function of a deduplication policy, an intended recipient of the outgoing data, network conditions, or other variables.

While FIG. 7 illustrates example apparatus 700 that includes various components connected in various ways, it is to be appreciated that other apparatus may include other components connected in other ways.

Figure 8:
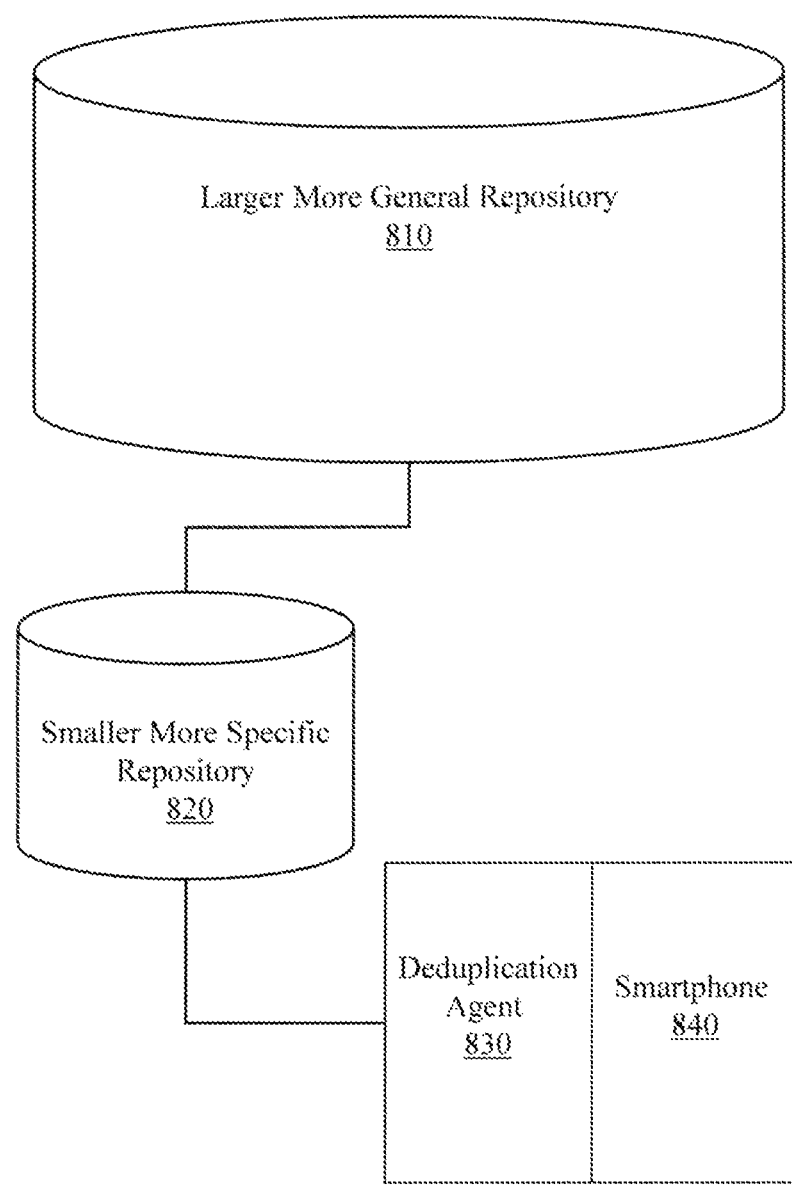
FIG. 8 illustrates an example environment in which example methods and apparatus may be implemented.

FIG. 8 illustrates an example environment in which example methods and apparatus may be implemented. For example, smartphone apparatus 700 (FIG. 7) may be implemented as deduplication agent 830 and smartphone 840. A user may be associated with an organization that uses the larger more general repository 810. Repository logic 742 (FIG. 7) may access the smaller more specific repository 820 and establish the smaller more specific repository 828 as a personal or context sensitive deduplication repository.

Figure 9:
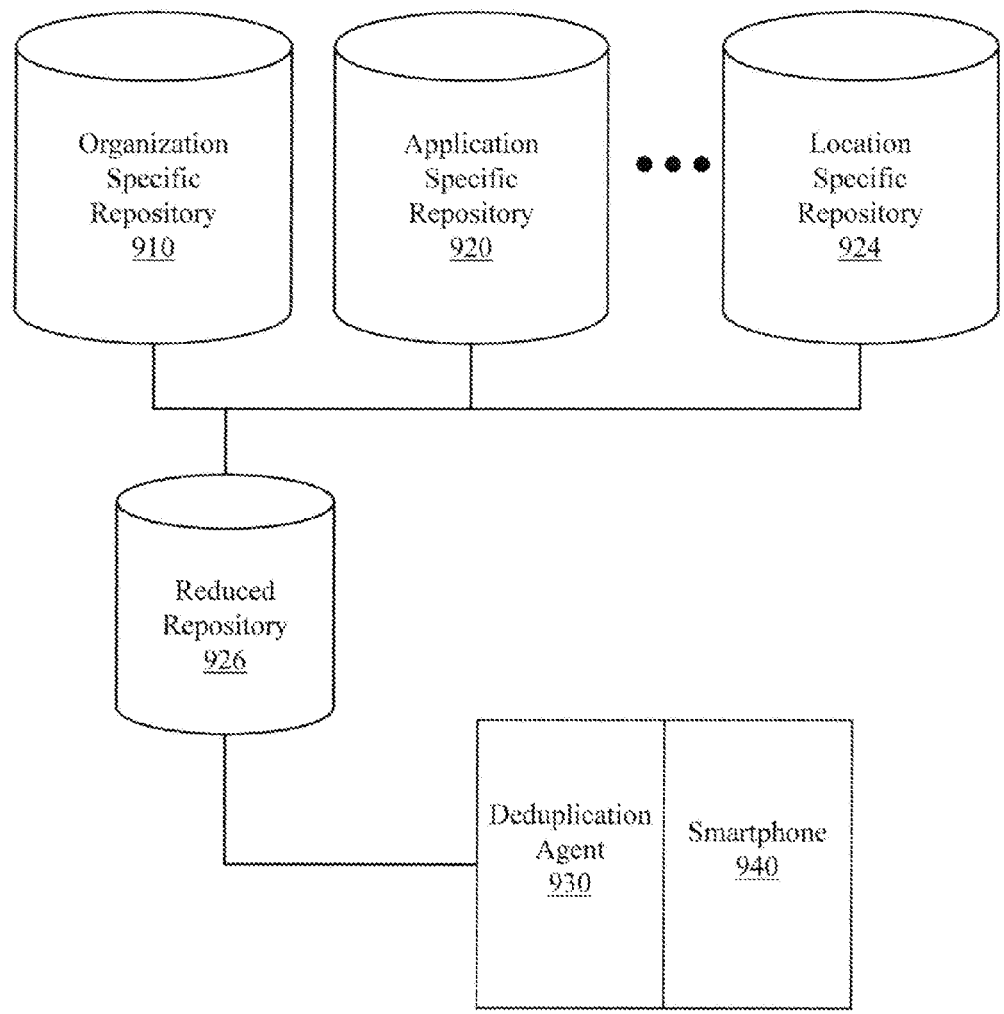
FIG. 9 illustrates an example environment in which example methods and apparatus may be implemented.

FIG. 9 illustrates another example environment in which example methods and apparatus may be implemented. For example, an organization such as a university may employ organization specific repository 910. Example methods and apparatus may determine that a user associated with the university who uses a particular mathematics application on a particular smartphone 940 may have a 75% chance of using the application specific repository 920. Example methods and apparatus may detect a context associated with the user, and may therefore establish a portion of application specific repository 920 as a reduced repository 926. Example methods and apparatus may detect a location of the user and establish a portion of location specific repository 924 as a reduced repository 926 Example methods and apparatus may then control the reduced repository 926 to be downloaded to a deduplication agent 930. The deduplication agent 930 may be a router that is within a threshold physical distance of the user's smartphone 940.

Figure 10:
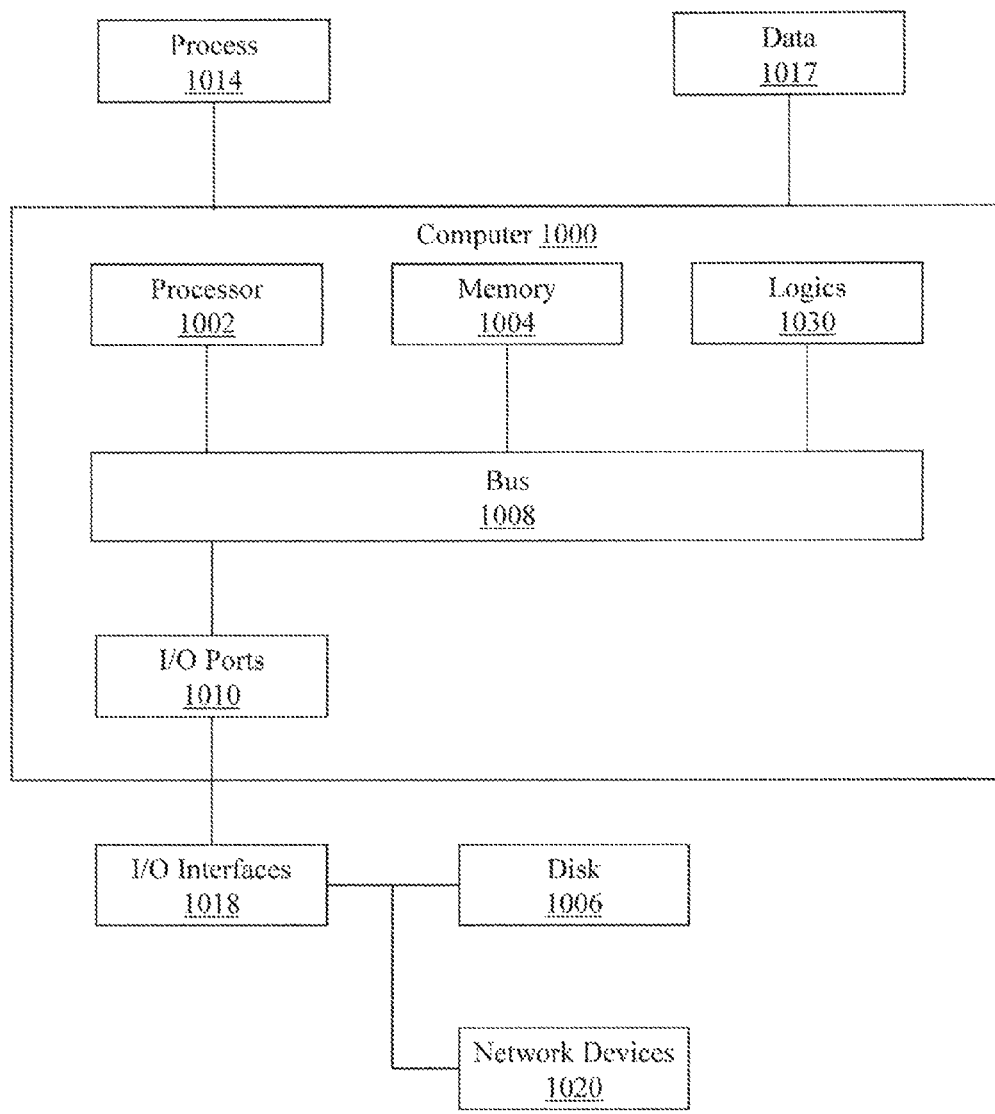
FIG. 10 illustrates an example computer in which example methods and apparatus may be implemented.

FIG. 10 illustrates an example computer 1000 in which example methods illustrated herein can operate and in which example logics may be implemented. In different examples, computer 1000 may be part of a smartphone, a router, a server, a laptop computer, a tablet computer, another communication node, or may be operably connectable to a mobile device.

Computer 1000 includes a processor 1002, a memory 1004, and input/output ports 1010 operably connected by a bus 1008. In one example, computer 1000 may include a set of logics 1030 that perform a method of storing a message in a distributed data storage system using adaptive erasure codes. Thus, the set of logics 1030, whether implemented in computer 1000 as hardware, firmware, software, and/or a combination thereof may provide means (e.g., hardware, software) for performing personal deduplication on a mobile device. In different examples, the set of logics 1030 may be permanently and/or removably attached to computer 1000. In one embodiment, the functionality associated with the set of logics 1030 may be performed, at least in part, by hardware logic components including, but not limited to, FPGAs, ASICs. ASPS, SOCs, or CPLDs. In one embodiment, individual members of the set of logics 1030 are implemented as ASICs or SOCs.

Processor 1002 can be a variety of various processors including dual microprocessor and other multi-processor architectures. Memory 1004 can include volatile memory and/or non-volatile memory. A disk 1006 may be operably connected to computer 1000 via, for example, an input/output interface (e.g., card, device) 1018 and an input/output port 1010. Disk 1006 may include, but is not limited to, devices like a magnetic disk drive, a tape drive, a Zip drive, a flash memory card, or a memory stick. Furthermore, disk 1006 may include optical drives like a CD-ROM or a digital video ROM drive (DVD ROM). Memory 1004 can store processes 1014 or data 1017, for example. Disk 1006 or memory 1004 can store an operating system that controls and allocates resources of computer 1000.

Bus 1008 can be a single internal bus interconnect architecture or other bus or mesh architectures. While a single bus is illustrated. it is to be appreciated that computer 1000 may communicate with various devices, logics, and peripherals using other busses that are not illustrated (e.g., PCIE, SATA, Infiniband, 1394, USB, Ethernet).

Computer 1000 may interact with input/output devices via I/O interfaces 1018 and input/output ports 1010. Input/output devices can include, but are not limited to, a keyboard, a microphone, a pointing and selection device, cameras, video cards, displays, disk 1006, network devices 1020, or other devices. Input/output ports 1010 can include but are not limited to, serial ports, parallel ports, or USB ports.

Computer 1000 may operate in a network environment and thus may be connected to network devices 1020 via I/O interfaces 1018 or I/O ports 1010. Through the network devices 1020, computer 1000 may interact with a network. Through the network, computer 1000 may be logically connected to remote computers. The networks with which computer 1000 may interact include, but are not limited to, a local area network (LAN), a wide area network (WAN), or other networks.

References to "one embodiment", "an embodiment", "one example", and "an example" indicate that the embodiment (s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a non-transitory medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware or firmware, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or S but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable storage medium storing instructions that when executed by a processor in a mobile device control the processor to perform a method for performing personal deduplication on the mobile device, the method comprising:
   identifying a portion of a larger deduplication repository that has at least a threshold probability of being used by a user, and establishing a personal or context sensitive deduplication repository as the portion of the larger deduplication repository;
   selectively causing the portion of the larger deduplication repository to be made available to a user of the mobile device;
   accessing the personal or context sensitive deduplication repository;
   selectively de-duplicating data arriving at the mobile device, where the de-duplicating is performed using the personal or context sensitive deduplication repository; and
   selectively de-duplicating data to be transmitted by the mobile device, where the de-duplicating is performed using the personal or context sensitive deduplication repository.

2. The non-transitory computer-readable storage medium of claim 1, the method comprising controlling the mobile device to download information about the personal or context sensitive deduplication repository.

3. The non-transitory computer-readable storage medium of claim 2, the method comprising controlling the mobile device to download the portion of the personal or context sensitive deduplication repository.

4. The non-transitory computer-readable storage medium of claim 3, the method comprising controlling the mobile device to download a type of data from the personal or context sensitive deduplication repository, where the type of data is a hash code, a fingerprint, or a block identifier.

5. The non-transitory computer-readable storage medium of claim 4, the method comprising controlling the mobile device to cause the portion of the personal or context sensitive deduplication repository, the information about the personal or context sensitive deduplication repository, or type of data from the personal or context sensitive deduplication repository, to be downloaded to a first location within a threshold distance of the mobile device.

6. The non-transitory computer-readable storage medium of claim 5, where the threshold distance is a physical distance, or a logical distance.

7. The non-transitory computer-readable storage medium of claim 6, where the context is based, at least in part, on a time of use of the mobile device, a purpose of use of the mobile device, a location of the mobile device, or an application in use by the mobile device.

8. The non-transitory computer-readable storage medium of claim 7, where selectively deduplicating data to be transmitted by the mobile device includes speculatively deduplicating data that is within a threshold probability of being transmitted by the mobile device, where the probability that the data to be transmitted by the mobile device will be speculatively deduplicated is a function of an amount of available processing power, an amount of available bandwidth, an amount of energy required to process the data, an amount of energy required to transmit the data, or an amount of time since a previous transmission.

9. The non-transitory computer-readable storage medium of claim 7, where the probability that the method selectively deduplicates data arriving at the mobile device or selectively deduplicates data to be transmitted by the mobile device is a function of information about the mobile device, the information including an amount of available processor power, an amount of battery power available, an amount of available memory, an application using the data, or a data plan associated with the mobile device.

10. The non-transitory computer-readable storage medium of claim 9, where the data arriving at the mobile device includes incoming telemetry data.

11. The non-transitory computer-readable storage medium of claim 10, where the data arriving at the mobile device or the data to be transmitted by the mobile device includes image data or video data, where the image data or video data includes background image data and foreground image data.

12. The non-transitory computer-readable storage medium of claim 11, where, upon determining that a similarity between a background image data at a first instant and the background image data at a second instant is above a threshold level of similarity, de-duplicating the background image data.

13. The non-transitory computer-readable storage medium of claim 12, the method comprising conceptually de-resolving data to be selectively deduplicated.

14. The non-transitory computer-readable storage medium of claim 1, where the mobile device is a smartphone, a tablet computer, a laptop computer, a satellite phone, a game console, a car entertainment system, or a streaming video device.

15. The non-transitory computer-readable storage medium of claim 14, the method comprising:
generating a deduplicated message by de-duplicating a first message about to be transmitted from the mobile device, where the level of deduplication is a function of the similarity between the first message and a second, different message sent at an earlier time from the mobile device.

16. The non-transitory computer-readable storage medium of claim 15, where the deduplicated message includes a fingerprint, a hash code, an identifier, a delta code, or a vector code.

17. The non-transitory computer-readable storage medium of claim 1, where de-duplicating the data is performed using a chunking and hashing approach.

18. A smartphone apparatus, comprising:
a processor;
a memory;
a set of logics; and
an interface to connect the processor, the memory, and the set of logics,
the set of logics comprising:
a repository logic that accesses a smartphone-centric personal deduplication repository or context sensitive deduplication repository, where the repository logic accesses a portion of a larger deduplication repository that has at least a threshold probability of being used by a user, defines the smartphone-centric deduplication repository or context sensitive deduplication repository as the portion of the larger deduplication repository, and selectively causes the portion of the larger deduplication repository to be made available to the smartphone apparatus, where the context is a function of an identity of a user of the smartphone apparatus, a location of the smartphone apparatus, and an application in use by the smartphone apparatus;
an incoming logic that selectively deduplicates incoming data using the smartphone-centric deduplication repository or context sensitive deduplication repository; and
an outgoing logic that selectively deduplicates outgoing data using the smartphone-centric deduplication repository or context sensitive deduplication repository.

19. The smartphone apparatus of claim 18, where the repository logic downloads the portion of the smartphone-centric deduplication repository, or information about the smartphone-centric deduplication repository to the smartphone apparatus or to another device located within a threshold distance of the smartphone apparatus.

20. The smartphone apparatus of claim 19, where the incoming logic selectively deduplicates incoming data using the smartphone-centric deduplication repository based on a property of the smartphone apparatus or a property of the incoming data, where the property of the smartphone apparatus includes an amount of available processor power, an amount of available memory, an application using the data, or a data plan associated with the smartphone apparatus, where the property of the incoming data includes a data type, a file size, a block size, a packet size, an age of the incoming data, or an identification of a sender associated with the incoming data, and where selectively de-duplicating the incoming data includes controlling the level of deduplication based on the property of the smartphone apparatus or the property of the incoming data.

21. The smartphone apparatus of claim 20, where the outgoing logic selectively deduplicates outgoing data by speculatively de-duplicating data that is within a threshold probability of being transmitted by the smartphone apparatus, where the probability that the outgoing logic will speculatively deduplicate the outgoing data is a function of the property of the smartphone apparatus or a property of a target of the outgoing data, the property of the smartphone apparatus including an amount of energy required to transmit the data, or time since a previous transmission, and where selectively de-duplicating the outgoing data includes controlling the level of deduplication based on the property of the smartphone apparatus or the property of the target of the outgoing data.

22. The smartphone apparatus of claim 21, where the outgoing logic or the incoming logic selectively deduplicate data using a chunking and hashing approach, a vectored deduplication approach, or a delta deduplication approach.

23. The smartphone apparatus of claim 22, where the repository logic synchronizes the portion of the smartphone-centric deduplication repository, or information about the smartphone-centric deduplication repository, with the smartphone apparatus or with another device located within a threshold distance of the smartphone apparatus.

24. The non-transitory computer-readable storage medium of claim 7, the method comprising controlling the mobile device to detect a second, different location within the threshold distance of the mobile device, and controlling the mobile device to cause the synchronization of the portion of the personal or context sensitive deduplication repository, the information about the personal or context sensitive deduplication repository, or type of data from the personal or context sensitive deduplication repository on the mobile device or located at the first location, with a portion of the personal or context sensitive deduplication repository, information about the personal or context sensitive deduplication repository, or type of data from the personal or context sensitive deduplication repository located on the second, different location.

* * * * *